(12) United States Patent
Okamoto et al.

(10) Patent No.: US 8,994,850 B2
(45) Date of Patent: Mar. 31, 2015

(54) APPARATUS AND METHOD FOR PHOTOGRAPHING INFORMATION MANAGEMENT

(75) Inventors: Teppei Okamoto, Saitama (JP); Koichi Ishibashi, Tokyo (JP); Naoki Koshikawa, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/425,684

(22) Filed: Mar. 21, 2012

(65) Prior Publication Data
US 2012/0249832 A1    Oct. 4, 2012

(30) Foreign Application Priority Data

Mar. 29, 2011  (JP) ................................. 2011-072133

(51) Int. Cl.
| | | |
|---|---|---|
| H04N 5/76 | (2006.01) | |
| H04N 9/04 | (2006.01) | |
| H04N 1/21 | (2006.01) | |
| H04N 1/00 | (2006.01) | |
| H04N 1/32 | (2006.01) | |
| H04N 101/00 | (2006.01) | |

(52) U.S. Cl.
CPC ........... *H04N 1/2112* (2013.01); *H04N 1/0044* (2013.01); *H04N 1/2158* (2013.01); *H04N 1/32112* (2013.01); *H04N 2101/00* (2013.01); *H04N 2201/0084* (2013.01); *H04N 2201/325* (2013.01); *H04N 2201/3253* (2013.01); *H04N 2201/3254* (2013.01)
USPC .................. 348/231.2; 348/231.3; 348/231.7; 348/231.8; 348/231.9; 348/207.99

(58) Field of Classification Search
USPC ........... 348/231.3–231.9, 207.99, 207, 99, 77
See application file for complete search history.

(56) References Cited

U.S. PATENT DOCUMENTS

| | | | |
|---|---|---|---|
| 6,282,362 B1 * | 8/2001 | Murphy et al. ............... | 386/224 |
| 6,353,823 B1 * | 3/2002 | Kumar ................................ | 1/1 |
| 6,741,864 B2 * | 5/2004 | Wilcock et al. ............ | 455/456.1 |
| 6,914,626 B2 * | 7/2005 | Squibbs ..................... | 348/231.3 |
| 7,477,295 B2 * | 1/2009 | Tanaka ....................... | 348/231.3 |
| 7,872,669 B2 * | 1/2011 | Darrell et al. .............. | 348/207.1 |
| 8,027,577 B2 * | 9/2011 | Kurosawa ....................... | 396/49 |
| 2005/0013488 A1 * | 1/2005 | Hashimoto et al. ........... | 382/216 |
| 2005/0212814 A1 * | 9/2005 | Kubo ............................ | 345/614 |
| 2006/0090122 A1 * | 4/2006 | Pyhalammi et al. ....... | 715/500.1 |
| 2008/0205771 A1 * | 8/2008 | Kraus et al. .................. | 382/224 |

(Continued)

FOREIGN PATENT DOCUMENTS

| | | |
|---|---|---|
| JP | 2002-238011 | 8/2002 |
| JP | 2004-080359 | 3/2004 |
| JP | 2009-116795 | 5/2009 |

*Primary Examiner* — Sinh Tran
*Assistant Examiner* — Xi Wang
(74) *Attorney, Agent, or Firm* — Greenblum & Bernstein, P.L.C.

(57) ABSTRACT

A photographing information management method, which includes: judging whether there is equality between photographing position information added to an image file stored in an external storage medium which is detachably attachable to an imaging apparatus and photographing position information stored in an internal memory of the imaging apparatus; and when it is judged that the two pieces of photographing position information have the equality, displaying an image and the photographing position information of the image file on a display screen of the imaging apparatus.

13 Claims, 15 Drawing Sheets

(56) References Cited

U.S. PATENT DOCUMENTS

| | | | |
|---|---|---|---|
| 2010/0007671 A1* | 1/2010 | Lee | 345/530 |
| 2010/0026382 A1* | 2/2010 | Higaki et al. | 327/544 |
| 2010/0030860 A1* | 2/2010 | Iwasawa et al. | 709/206 |
| 2011/0058028 A1* | 3/2011 | Sakai | 348/77 |
| 2012/0045132 A1* | 2/2012 | Wong et al. | 382/195 |
| 2012/0105651 A1* | 5/2012 | Lahcanski et al. | 348/207.1 |

* cited by examiner

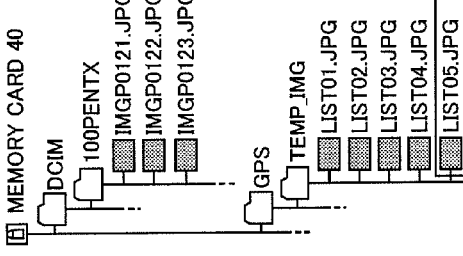
FIG. 5C
| ID | REGISTRATION NAME | LATITUDE | LONGITUDE |
|---|---|---|---|
| 01 | Madrid | N 40° 24.000' | W 3° 42.000' |
| 02 | London | N 51° 30.000' | W 0° 07.000' |
| 03 | Paris | N 48° 51.000' | E 2° 21.000' |
| 04 | Amsterdam | N 52° 22.000' | E 4° 54.000' |
| 05 | Tokyo Dome | N 35° 45.410' | W123° 45.001' |
| 06 | Milan | N 45° 28.000' | E 9° 10.000' |
| ... | ... | ... | ... |
| 38 | New York | N 40° 43.000' | W 74° 00.000' |
DESTINATION LIST L
FIG. 5D
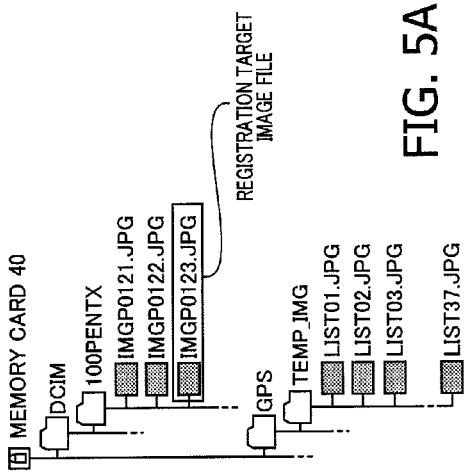
FIG. 5A
| ID | REGISTRATION NAME | LATITUDE | LONGITUDE |
|---|---|---|---|
| 01 | Madrid | N 40° 24.000' | W 3° 42.000' |
| 02 | London | N 51° 30.000' | W 0° 07.000' |
| 03 | Paris | N 48° 51.000' | E 2° 21.000' |
| 04 | Amsterdam | N 52° 22.000' | E 4° 54.000' |
| 05 | Milan | N 45° 28.000' | E 9° 10.000' |
| ... | ... | ... | ... |
| 37 | New York | N 40° 43.000' | W 74° 00.000' |
DESTINATION LIST L
FIG. 5B

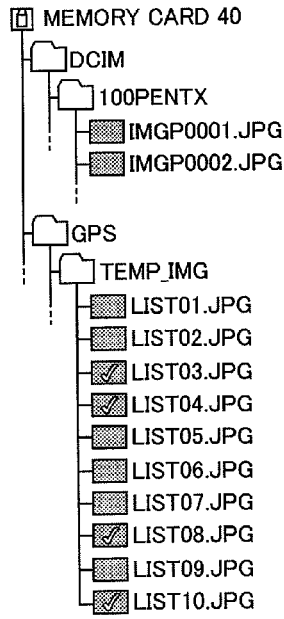

FIG. 10A

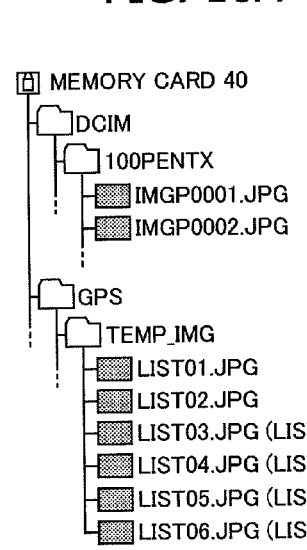

DESTINATION LIST L

| ID | REGISTRATION NAME | LATITUDE | LONGITUDE | |
|---|---|---|---|---|
| 01 | Madrid | N 40° 24.000′ | W 3° 42.000′ | ☐ |
| 02 | London | N 51° 30.000′ | W 0° 07.000′ | ☐ |
| 03 | Paris | N 48° 51.000′ | E 2° 21.000′ | ☑ |
| 04 | Amsterdam | N 52° 22.000′ | E 4° 54.000′ | ☑ |
| 05 | Milan | N 45° 28.000′ | E 9° 10.000′ | ☐ |
| 06 | Guam | N 13° 27.000′ | E 144° 47.000′ | ☐ |
| 07 | Sydney | N 33° 52.000′ | E 151° 12.000′ | ☐ |
| 08 | Denver | N 39° 44.000′ | W 104° 54.000′ | ☑ |
| 09 | Chicago | N 41° 54.000′ | W 87° 39.000′ | ☐ |
| 10 | New York | N 40° 43.000′ | W 74° 00.000′ | ☑ |

FIG. 10B

DESTINATION LIST L

| ID | REGISTRATION NAME | LATITUDE | LONGITUDE |
|---|---|---|---|
| 01 | Madrid | N 40° 24.000′ | W 3° 42.000′ |
| 02 | London | N 51° 30.000′ | W 0° 07.000′ |
| 03 | Milan | N 45° 28.000′ | E 9° 10.000′ |
| 04 | Guam | N 13° 27.000′ | E 144° 47.000′ |
| 05 | Sydney | N 33° 52.000′ | E 151° 12.000′ |
| 06 | Chicago | N 41° 54.000′ | W 87° 39.000′ |

FIG. 10D

LIST03.JPG (LIST05.JPG BEFORE EXECUTION OF ADDITION)
LIST04.JPG (LIST06.JPG BEFORE EXECUTION OF ADDITION)
LIST05.JPG (LIST07.JPG BEFORE EXECUTION OF ADDITION)
LIST06.JPG (LIST09.JPG BEFORE EXECUTION OF ADDITION)

FIG. 10C

APPARATUS AND METHOD FOR PHOTOGRAPHING INFORMATION MANAGEMENT

BACKGROUND OF THE INVENTION

The present invention relates to a photographing information management method and a photographing information management apparatus for managing photographic images and addition information thereof.

Recently, various types of techniques utilizing GPS (Global Positioning System) in an imaging apparatus such as DSC (Digital Still Camera) have been proposed. For example, Japanese Patent Provisional Publication No. 2002-238011A (hereafter referred to as patent document #1) discloses an imaging apparatus which utilizes GPS for folder management of photographic image files. Specifically, the imaging apparatus disclosed in patent document #1 judges a photographing place based on a measurement result by GPS. The imaging apparatus automatically creates a directory as needed, based on the judgment result, and stores the photographic image file. The photographic image files are managed based on a predetermined unit, such as a state or a city.

The measurement result of GPS is stored in the photographic image file in a predetermined format, in cooperation between an image processing circuit in a main body of the imaging apparatus and a GPS module. For example, with regard to an image format complying with Exif (Exchangeable image file format), the GPS measurement result is stored in Exif area of the photographic image file, as a geotag.

The photographic image file of this type indicates that the image is taken by a user at the place in the past. The position information stored in the photographic image file can be used as simplified navigation information, through comparison with the present position measured by GPS (i.e., a relative distance and orientation between the position information and the present position). Therefore, the position information is useful, for example, for the user who wants to take a photograph at the place again. The user is able to smoothly go to the photographing place (destination) in accordance with the simplified navigation information displayed on a display screen of the imaging apparatus or by referring to the position information itself. In this case, the photographic image is used to visually determine whether the place at which the user has arrived is a proper photographing place.

SUMMARY OF THE INVENTION

Incidentally, a typical imaging apparatus has an internal memory as a storing area for photographic image files (e.g., a file containing position information, a name and a photographic image of a destination by GPS). However, the internal memory has a low capacity, and therefore the internal memory is merely used as an auxiliary memory area. That is, the number of photographic image files which the internal memory is able to store is small, and it is difficult to entirely store the photographic image files in the internal memory. For this reason, in general, the imaging apparatus of this type is used such that photographic image files are additionally stored in a compact portable storage medium, such as a memory card, as well as the internal memory.

Since the compact portable storage medium of this type can be detachably attachable to the main body of the imaging apparatus, it is possible to update or delete data of the compact portable storage medium independently from the main body of the imaging apparatus. There is a case where the imaging apparatus is used in a state where another type of compact portable storage medium is attached to the imaging apparatus. Therefore when a photographic image file is to be read from a compact portable storage medium and is used in the main body of the imaging apparatus, a problem may arise that an image file to be read is a file of an image taken by another type of (incompatible) imaging apparatus or no data is stored in the compact portable storage medium. That is, there may be a case where information concerning a destination (an image and position information) cannot be properly displayed when a storing target is simply changed from the internal memory to the compact portable storage medium.

The present invention is advantageous in that it provides a photographing information management method and a photographing information management apparatus suitable for displaying a photographic image and position information thereof without making a great degree of design change and addition of a mechanism with respect to a main body of an imaging apparatus.

According to an aspect of the invention, there is provided a photographing information management method, which includes: judging whether there is equality between photographing position information added to an image file stored in an external storage medium which is detachably attachable to an imaging apparatus and photographing position information stored in an internal memory of the imaging apparatus; and when it is judged that the two pieces of photographing position information have the equality, displaying an image and the photographing position information of the image file on a display screen of the imaging apparatus.

According to the above described configuration, when it is judged that there is no equality between the two pieces of photographing position information, it can be assumed that the image of the image file of the judgment target corresponds to a place where the user (owner) of the photographing apparatus has never been to. Therefore, the photographing position information and the image of the image file are not displayed on the display screen of the photographing apparatus, assuming that the information is unnecessary information (because the information does not relate to the information stored in the internal memory of the imaging apparatus).

Therefore, a photographing information management method suitable for displaying a photographic image and position information thereof without making a great degree of design change and addition of a mechanism with respect to a main body of an imaging apparatus can be provided.

In at least one aspect, the photographing information management method may further include: generating a thumbnail image from the image file to which the photographing position information is added; extracting the photographing position information from the image file; generating a thumbnail image file by adding the extracted photographing position information to the thumbnail image as meta information; storing the generated thumbnail image file in the external storage medium; and storing the extracted photographing position information in the internal memory. In the step of judging, the equality between the photographing position information added to the thumbnail image file and the photographing position information stored in the internal memory is judged.

The thumbnail image file has a small file size, and remains in a storage medium even when the original image is deleted. Therefore, according to the above described configuration, it becomes possible to hold a plurality of pieces of photographing position information and a plurality of images in the imaging apparatus (i.e., in the internal memory or the external storage medium). As a result, the above described configuration is advantageous in regard to execution of the function (e.g., the navigation function using the photographic image and the photographing position information) in which the photographing position information is used together with the photographic image while the user takes along the imaging apparatus.

In at least one aspect, the photographing information management method may further include: designating the image file in the external storage medium; and judging whether the photographing position information is added to the designated image file. In the step of generating a thumbnail image, the thumbnail image is generated only for the image file for which it is judged that the photographing position information is added.

In at least one aspect, the photographing information management method may further include: designating a deletion target from a plurality of pieces of photographing position information stored in the internal memory; and deleting the photographing position information of the designated deletion target and the thumbnail image file corresponding to the deletion target.

In at least one aspect, the photographing information management method may further include: obtaining the photographing position information of a photographic image using Global Positioning System; and generating the image file by adding the obtained photographing position information to the image file as meta information of the photographic image.

According to another aspect of the invention, there is provided a photographing information management apparatus, which includes: a connection unit to which an external storage medium is detachably attached; an internal memory storing photographing position information; an equality judgment unit configured to judge whether there is equality between the photographing position information added to an image file stored in the external storage medium and the photographing position information stored in the internal memory; and a display unit configured to display an image and the photographing position information of the image file on a display screen when it is judged by the equality judgment unit that the two pieces of photographing position information have the equality.

With this configuration, a photographing information management apparatus suitable for displaying a photographic image and position information thereof without making a great degree of design change and addition of a mechanism with respect to a main body of an imaging apparatus can be provided.

In at least one aspect, the photographing information management apparatus may further include: a thumbnail image generation unit configured to generate a thumbnail image from the image file to which the photographing position information is added; a photographing position extraction unit configured to extract the photographing position information from the image file; a thumbnail image file generation unit configured to generate a thumbnail image file by adding the extracted photographing position information to the thumbnail image as meta information; a thumbnail image file storing unit configured to store the generated thumbnail image file in the external storage medium; and a photographing position information storing unit configured to store the extracted photographing position information in the internal memory. In this case, the equality judgment unit judges the equality between the photographing position information added to the thumbnail image file and the photographing position information stored in the internal memory.

In at least one aspect, the photographing information management apparatus may further include: an image file designation unit configured to designate the image file in the external storage medium; and an information addition judgment unit configured to judge whether the photographing position information is added to the designated image file. In this case, the thumbnail image generation unit is configured to generate the thumbnail image only from the image file for which the information addition judgment unit judges that the photographing position information is added.

In at least one aspect, the thumbnail image file storing unit may be configured to store the thumbnail image file in an invisible area of the external storage medium. The invisible area is an area which a user is not able to visually recognize.

In at least one aspect, the photographing information management apparatus may further include: a deletion target designation unit configured to designate a deletion target from a plurality of pieces of photographing position information stored in the internal memory; and a deletion unit configured to delete the thumbnail image file in the invisible area corresponding to the designated deletion target, in addition to deleting the photographing position information of the designated deletion target.

In at least one aspect, the photographing information management apparatus may further include a data storing unit configured to store thumbnail image files in the invisible area and a plurality of pieces of photographing position information in the internal memory corresponding to the thumbnail image files, in an accessible folder in the external storage medium.

In at least one aspect, the photographing information management apparatus may further include: a various information deletion unit configured to delete the thumbnail image files in the invisible area and the plurality of pieces of photographing position information in the internal memory; and a various information storing unit configured to store the thumbnail image files stored in the folder into the visible area and to store the plurality of pieces of photographing position information into the internal memory.

In at least one aspect, the photographing information management apparatus may further include: a photographing position information obtaining unit configured to obtain the photographing position information of the photographic image using Global Positioning System; and an image file generation unit configured to generate the image file by adding the obtained photographing position information to the image file as meta information of the photographic image.

BRIEF DESCRIPTION OF THE
ACCOMPANYING DRAWINGS

FIGS. 5A to 5D are explanatory illustrations for explaining the destination information registration process of FIG. 4.

FIGS. 10A to 10D are explanatory illustrations for explaining the destination information deletion mode.

DETAILED DESCRIPTION OF THE EMBODIMENTS

Hereinafter, an imaging apparatus according to an embodiment of the invention is described with reference to the accompanying drawings.

Figure 1:
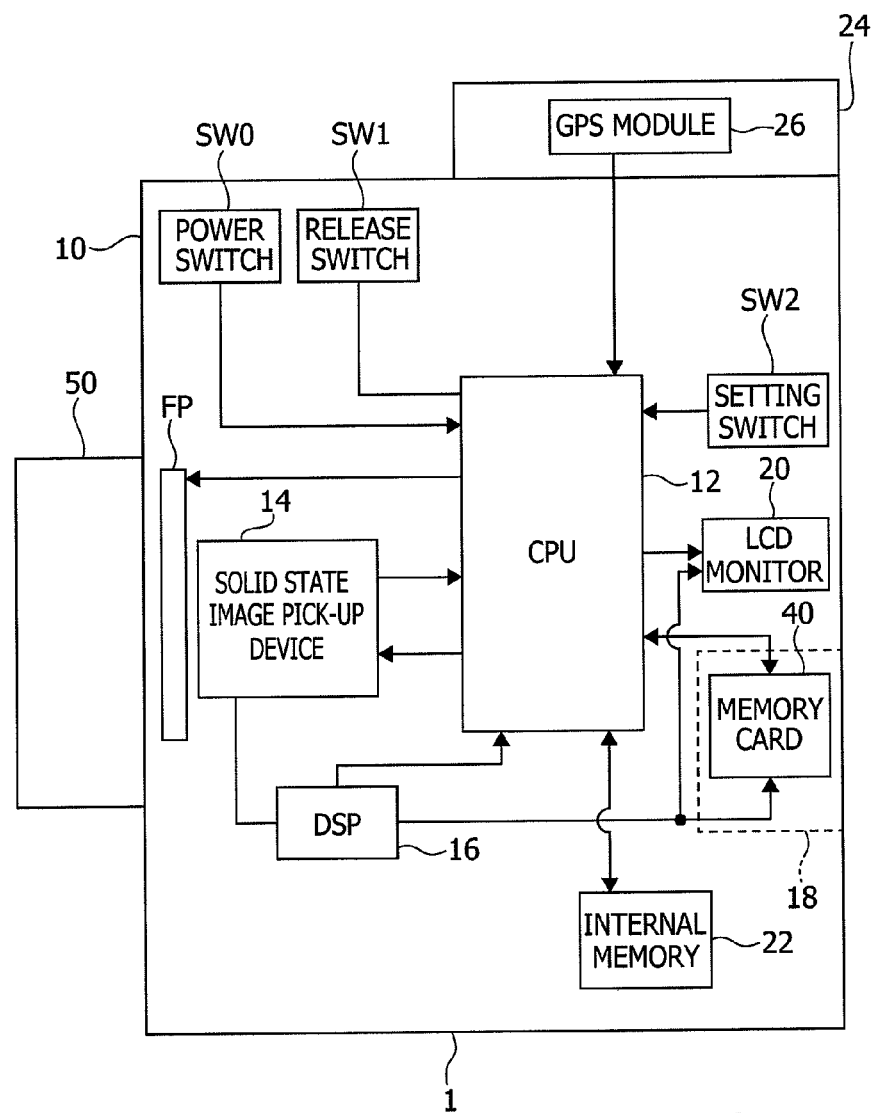
FIG. 1 illustrates a mechanical structure and a circuit configuration of an imaging apparatus according to an embodiment of the invention.
Figure 2:
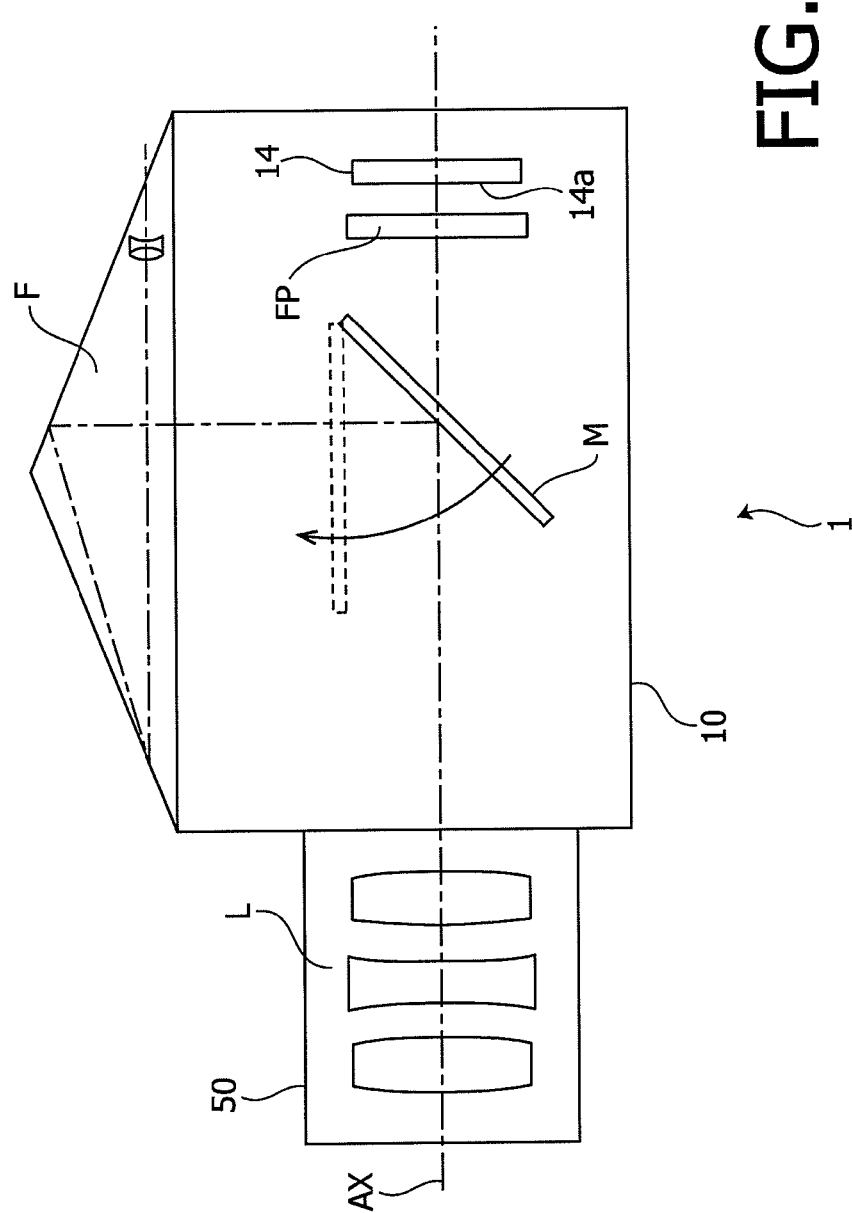
FIG. 2 illustrates an optical system of the imaging apparatus according to the embodiment of the invention.

FIGS. 1 and 2 illustrate a configuration of an imaging apparatus 1 according to the embodiment. FIG. 1 principally illustrates a mechanical structure block and a circuit block of the imaging apparatus 1. FIG. 2 principally illustrates an optical system of the imaging apparatus 1. In this embodiment, the imaging apparatus 1 is assumed to be a digital single lens reflex camera. However, in another embodiment, the imaging apparatus 1 may be configured as a compact digital camera, a camcorder, a mobile phone, a PHS (Personal Handy Phone) or a portable game machine.

As shown in FIG. 1, the imaging apparatus 1 includes a camera main body 10 and an imaging lens 50. In the camera main body 10, a CPU 12 which totally controls operations and timing of various circuits is provided. When a power switch SW0 is turned ON, power is supplied to the various circuits in the imaging apparatus 1 from a battery (not shown) via a power line.

As shown in FIG. 2, light from a subject is incident on a finder optical system F via an imaging optical system L and a mirror M. A photographer is able to observe a subject image by peeking into an eyepiece lens of the finder optical system F.

When a release switch SW1 is pressed, the mirror M is lifted up to a position indicated by a dashed line shown in FIG. 2 by driving control of the CPU 12, and a focal plane shutter FP is opened in accordance with a shutter speed. Consequently, the light from the subject is received by a solid state image pick-up device 14 through the imaging optical system L and the focal plane shutter FP.

The solid state image pick-up device 14 is, for example, a single ship color CCD (Charge Coupled Device) image sensor having a Bayer arrangement. In accordance with driving control from the CPU 12, the solid state image pick-up device 14 accumulates charges in response to a light amount of a converged optical image at each pixel on an imaging surface 14a, and converts the charges into an imaging signal. The converted image signal is subjected to image processing such as A-D conversion and signal amplification, and then is inputted to a DSP 16. It should be noted that the solid state image pick-up device 14 is not limited to the CCD image sensor, but may be a CMOS (Complementary Metal Oxide Semiconductor) image sensor.

The DSP 16 executes signal processing such as color interpolation, a matrix calculation and Y/C separation, for the inputted image signal to generate a luminance signal Y and color difference signals Cb and Cr, and compresses the image signal in a certain format, such as JPEG (Joint Photographic Experts Group). The DSP 16 makes a file of the compressed image data so that the compressed image data can be accessed on a certain file system. The compressed image file is, for example, a file complying with Exif standard, and is stored in a memory card 40 inserted into a card slot 18. Furthermore, the DSP 16 buffers each color signal which has been subjected to the matrix calculation in a separate frame memory on a basis of a frame. The DSP 16 sweeps out each buffered color signal at a predetermined timing from each frame memory, converts the buffered color signals into an image signal to generate an image, and displays the image on a LCD (Liquid Crystal Display) monitor 20. The photographer is able to visually recognize the photographic image through the LCD monitor 20.

In an accessory shoe of the camera main body 10, a detachable GPS adapter 24 is attached. In the GPS adapter 24, a GPS module 26 is mounted. The GPS module 26 acquires and tracks GPS signals from GPS satellites, the number of which is more than or equal to a predetermined number required for position measurement, calculates the position information (e.g., latitude and longitude), and outputs the position information to the CPU 12. It should be noted that the GPS module 26 may be replaced with a sensor module on which a DR (Dead Reckoning) sensor having a known configuration for autonomous navigation is mounted. Alternatively, the GPS module 26 may be configured to use GPS in combination with DR to obtain a piece of position information. The GPS adapter 24 may not be configured as a separate unit, but may be accommodated in the camera main body 10.

When the compressed image data is converted into a file, the position information (latitude and longitude) calculated by the GPS module 26 when the release switch SW1 is pressed is buried in the Exif area as a geotag. The position information buried as a geotag is not limited to the latitude and longitude. For example, orientation may additionally be stored as a geotag. The orientation may be estimated based on the GPS measurement result by the GPS module 26. Alternatively, a magnetic sensor which detects earth magnetism based on a hall voltage may be additionally used. In this case, the CPU 12 calculates the orientation of the camera main body 10 based on an output of the magnetic sensor.

In general, the memory card 40 has a limited memory capacity. Therefore, an older photographic image file has tendency to be deleted from the memory card 40 after it is copied to an information processing terminal such as a PC or a large volumetric storage such an HDD. For this reason, in this embodiment, in order to enable the photographer to check the past photographic image and the position information including the photographic image and the position information of the photographic image file deleted from the memory card 40, on the LCD monitor 20 of the camera main body 10, the imaging apparatus 1 executes the processes indicated below.

In the following, the following items are explained sequentially.
1. Registration of Destination Information
2. Copying of Destination Information in Memory Card
3. Deletion of Destination Information
4. Reading of Destination Information from Memory Card
5. Selection of Destination Information <1. Registration of Destination Information>

When a predetermined operation is conducted while the LCD monitor 29 displays an image, the mode of the imaging apparatus 1 moves to a destination information registration mode. The destination information registration mode is a mode for registering a photographic image and position information as destination information. In the following explanation, unless otherwise noted, the term "operation" may be one of an operation with respect to any of mechanical keys provided on a rear surface of the camera main body 10, such as a setting switch SW2, and an operation with respect to a GUI on the LCD monitor 20.

Figure 3:
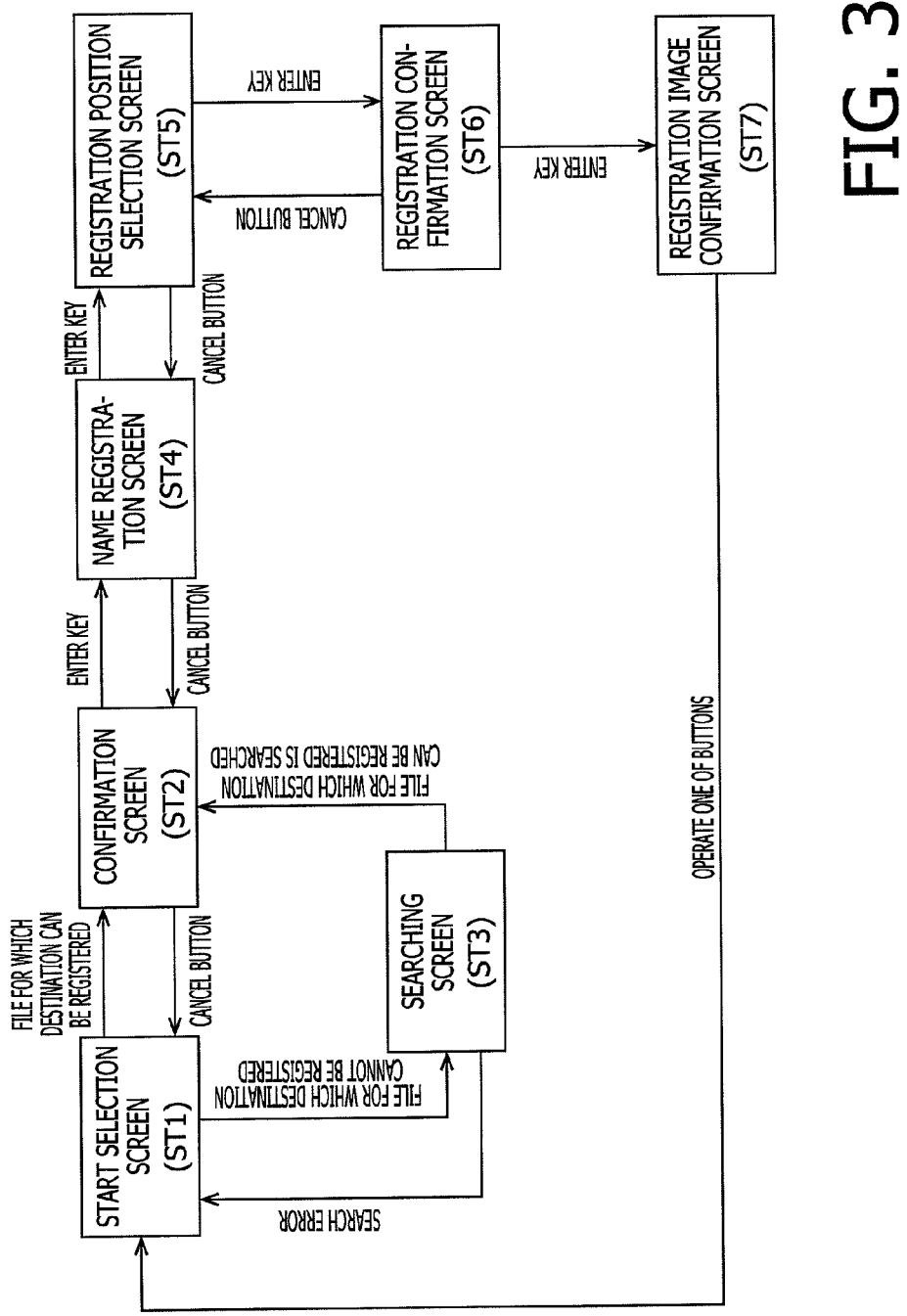
FIG. 3 is a screen transition diagram after moving to a destination information registration mode according to the embodiment of the invention.

FIG. 3 is a screen transition diagram after moving to the destination information registration mode. The destination information registration mode terminates when a predetermined mode termination operation is conducted or when power is turned OFF. For convenience of explanation, each screen is assigned a reference symbol STn (where n is a natural number).

Immediately after the mode has moved to the destination information registration mode, a start selection screen ST1 for selecting start of the destination information registration mode is displayed. When a start button for the destination information registration mode is selected on the start selection screen ST1, it is judged whether a file of an image displayed on the LCD monitor 20 immediately before the current screen is of a file type in which a destination can be registered. A file in which a destination can be registered means a photographic image file having an Exif area in which a geotag is buried. At this time, another judgment criterion may be additionally used. The judgment criterion to be additionally used includes whether the number of pieces of registered destination information reaches the maximum number. When the number of pieces of registered destination information has reached the maximum number, a predetermined error message is displayed on the LCD monitor 20, and the destination information registration mode terminates. Alternatively, the mode may moves to a destination information deletion mode (described later) for selectively deleting the registered destination information.

When a judgment target file is a file in which a destination can be registered, onscreen representation of the LCD monitor 20 moves from the start selection screen ST1 to a confirmation screen ST2. On the confirmation screen ST2, a registration target image, an Enter button and a cancel button are displayed. When the Enter button is selected, the onscreen representation of the LCD monitor 20 moves from the confirmation screen ST2 to a name registration screen ST4. When the cancel button is selected, the onscreen representation of the LCD monitor 20 returns from the confirmation screen ST2 to the start selection screen ST1.

When the judgment target file is a file in which a destination cannot be registered, the onscreen representation of the LCD monitor 20 moves from the start selection screen ST1 to a searching screen ST3. During displaying of the searching screen ST3, remaining image files in which destinations have not been registered are searched to find files in which destinations can be registered. When a file in which a destination can be registered is not found, a predetermined search error message is displayed on the LCD monitor 20, and thereafter the onscreen representation moves back from the searching screen ST3 to the start selection screen ST1. It should be noted that whether the photographic image file is a file in which a destination can be registered is judged by checking a predetermined flag in the photographic image file. The predetermined flag is described later. When a file in which a destination can be registered is found, the onscreen representation of the LCD monitor 20 moves from the searching screen ST3 to the confirmation screen ST2.

The name registration screen ST4 is a screen for setting a registration name of the destination information. On the name registration screen, a software keyboard, a default registration name "No. XX (XX: a unique number)", an Enter button and a cancel button are displayed. The default registration name may be used as a registration name without change, or the registration name may be changed using the software keyboard. When the Enter button is pressed, the registration name is determined, and the onscreen representation of the LCD monitor 20 moves from the name registration screen ST4 to a registration position selection screen ST5. When the cancel button is pressed, the onscreen representation screen of the LCD monitor 20 returns from the name registration screen ST4 to the confirmation screen ST2.

The registration position selection screen ST5 is a screen for designating an insertion position of a registration name of a registration target in a destination list (hereafter, a reference symbol "L" is added) in which the registered destination information is listed. On the registration position selection screen ST5, an Enter button and a cancel button as well as the destination list L are displayed. A default insertion position is the end of the destination list L. The insertion position moves tentatively from the end by operating an up and down key. When the Enter button is selected, the insertion position is determined, and the onscreen representation of the LCD monitor 20 moves from the registration position selection screen ST5 to a registration confirmation screen ST6. When the cancel button is selected, the onscreen representation of the LCD monitor 20 moves from the registration position selection screen ST5 to the name registration screen ST4.

The registration confirmation screen ST6 is a screen for determining registration of the destination information. On the registration confirmation screen ST6, a predetermined confirmation message, an Enter button and a cancel button are displayed. When the Enter button is selected, a destination information registration process is executed, and the onscreen representation of the LCD monitor 20 moves from the registration confirmation screen ST6 to a registration image confirmation screen ST7. When the cancel button is selected, the onscreen representation of the LCD monitor 20 returns from the registration confirmation screen ST6 to the registration position selection screen ST5.

On the registration image confirmation screen ST7, the photographic image registered as the destination information is displayed. When one of buttons is operated, the onscreen representation of the LCD monitor 20 returns from the registration image confirmation screen ST7 to the start selection screen ST1.

Figure 4:
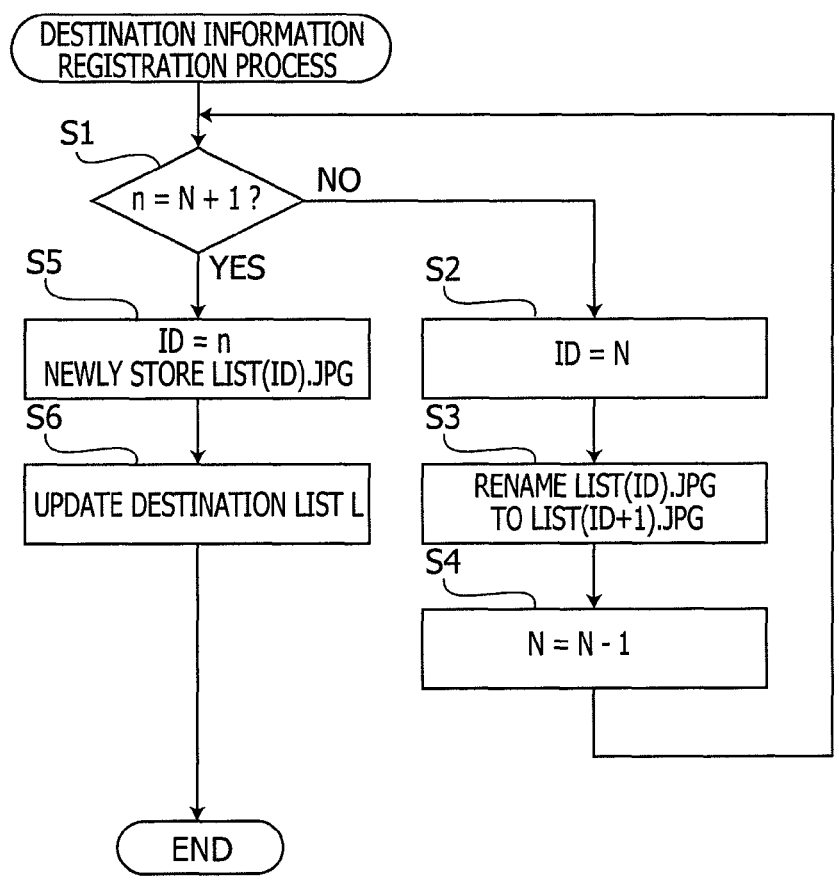
FIG. 4 is a flowchart illustrating a destination information registration process executed when an Enter button is selected on a registration confirmation screen in FIG. 3.

FIG. 4 is a flowchart illustrating the destination information registration process which is executed when the Enter button is selected on the registration confirmation screen ST6. In the following explanation and the drawings, a processing step is abbreviated as "S".

FIGS. 5A to 5D are explanatory illustrations for explaining the destination information registration process. FIG. 5A illustrates tree structures of folders in the memory card 40 before execution of additional registration of the destination information. FIG. 5B illustrates the destination list L stored in the internal memory 22 of the camera main body 10 before execution of additional registration of the destination information. FIG. 5C illustrates tree structures of folders in the memory card 40 after execution of the additional registration of the destination information. FIG. 5d illustrates the destination list L after execution of the additional registration of the destination information.

As shown in FIG. 5A, in a 100PENTX folder directly under a DCIM folder, photographic image files are stored. In a TEMP_IMG folder directly under a GPS folder, thumbnail image files which have been generated as a result of execution of the destination information registration process are stored. Filenames of the thumbnail image files are determined in accordance with a certain rule. As shown in each of FIGS. 5A to 5D, the number part in each filename of the thumbnail image file is assigned a serial number. In this embodiment, in order to prevent an erroneous operation by a user, the TMP_IMG folder is generated in an invisible area. Therefore, the user is not able to recognize existence of the TMP_IMG folder. However, in another embodiment, the TEMP_IMG folder may be generated in a visible area.

In the destination information registration process, N is defined as a total number of registered destinations before additional registration of the destination information. n is defined as an insertion position of the destination information to be additionally registered in the destination list L. As shown in FIG. 4, in step S1, it is judged whether n=N+1 holds. When n=N+1 does not hold (S1: NO), N is assigned to the identification number ID (S2). Next, in step S3, the existing file LIST(ID).JPG stored in the TEMP_IMG folder is renamed to LIST(ID+1).JPG (S3). Then, N is decremented by 1 after renaming (S4), and the process returns to S1.

When n=N+1 holds after repetition of steps S1 to S4 (S1: YES), the identification number ID is set for n, and a thumbnail image file LIST(ID).JPG of the registration target image is newly created and is stored in the TEMP_IMG folder (S5), and the destination list L is updated (S6).

The destination list L stores various types of information of each destination while associating them with respect to each other. The various types of information of the destination include an identification number ID, a registration name, latitude information and longitude information. In the updating process of the destination list L in S6, the ID is renumbered in accordance with the additional registration of the destination, and ID, the registration name set on the name registration screen ST4, and the latitude and longitude information extracted from the geotag of the original photographic image file (hereafter, referred to as an "original file") targeted for registration are added to the destination list L.

It should be noted that when insertion to the end of the destination list L is designated on the registration position selection screen ST5, n=N+1 holds. In this case (S1: YES), step S5 is executed without executing steps S2 to S4.

When step S5 is executed, a predetermined flag is assigned to a file of the registration target image. Presence/absence of the flag is linked to the presence/absence of the thumbnail image file. Specifically, a flag is added when a thumbnail image file is created, but the flag is deleted when the thumbnail image is deleted.

The thumbnail image generated in step S5 is, for example, an image file whose file size has been reduced and which has resolution complying with SQCIF (Sub Quarter Common Intermediate Format) standard. The thumbnail image has, as meta information, the latitude and longitude information extracted from the geotag of the original file of the registration target. Since the thumbnail image file is a file formed of a thumbnail image, latitude and longitude information, and minimum information necessary for accessing on a file system, the file size of the thumbnail image file is small. Therefore, the user is able to store a number of thumbnail files having the photographic image and the position information as the destination information in the memory card 40 without being concerned about the remaining amount of the memory card 40. In addition, the thumbnail image file remains in the memory card 40 after the original file having a large size is deleted. According to the embodiment, a number of photographic images and the position information can be held on the imaging apparatus 1 side (i.e., in the internal memory 22 and the memory card 44). Such a configuration is advantageous in regard to execution of the function (e.g., the navigation function utilizing the photographic image and the photographing position information) which uses the position information together with the photographic image when the user takes along the imaging apparatus 1.

Here, let us consider the case where the total number of destinations N is 37 and the insertion position n is 5 (see examples of FIGS. 5A and 5C). In this case, as shown in FIG. 5C, a thumbnail image file LIST05.JPG of the registration target image (e.g., IMGP0123.JPG shown in FIG. 5A) is newly generated, and is stored in the TEMP_IMG folder. The thumbnail image files LIST05.JPG to LIST37.JPG before the additional registration are renamed to LIST06.JPG to LIST38.JPG, respectively. Furthermore, as shown in FIG. 5D, the various types of information concerning a new destination are added to the destination list L, and renumbering of IDs in accordance with the inserted position and updating of positions in the list are executed.

In order for better understanding of the destination information registration process shown in FIG. 4, we further consider a case where the total number N is 5 and the insertion portion n is 3. In this case, before executing the destination information registration process (i.e., before executing a loop of steps S2 to S4), thumbnail image files are as follows.
ID 1: LIST1.JPG
ID 2: LIST2.JPG
ID 3: LIST3.JPG
ID 4: LIST4.JPG
ID 5: LIST5.JPG
In this case, the loop of steps S2 to S4 is executed three times. As a result, the thumbnail image files are renamed as follows.
ID 1: LIST1.JPG
ID 2: LIST2.JPG
ID 4: LIST4.JPG
ID 5: LIST5.JPG
ID 6: LIST6.JPG
Then, a new thumbnail image file LIST3.JPG is created and inserted in step S5. The following is resultant thumbnail image files processed in this case.
ID 1: LIST1.JPG
ID 2: LIST2.JPG
ID 3: LIST3.JPG
ID 4: LIST4.JPG
ID 5: LIST5.JPG
ID 6: LIST6.JPG <2. Copying of Destination Information in Memory Card>

Figure 6:
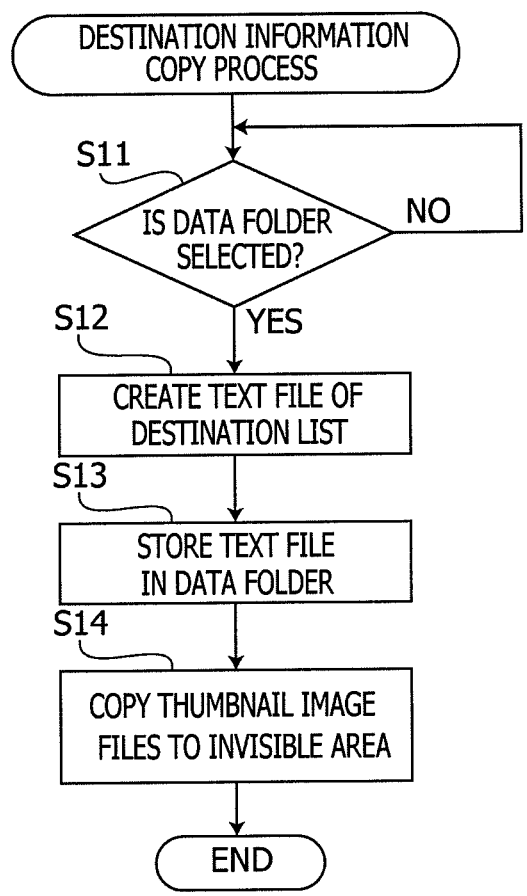
FIG. 6 is a flowchart illustrating a destination information copy process where all the destination information is copied into an accessible area in a memory card.
Figure 7:
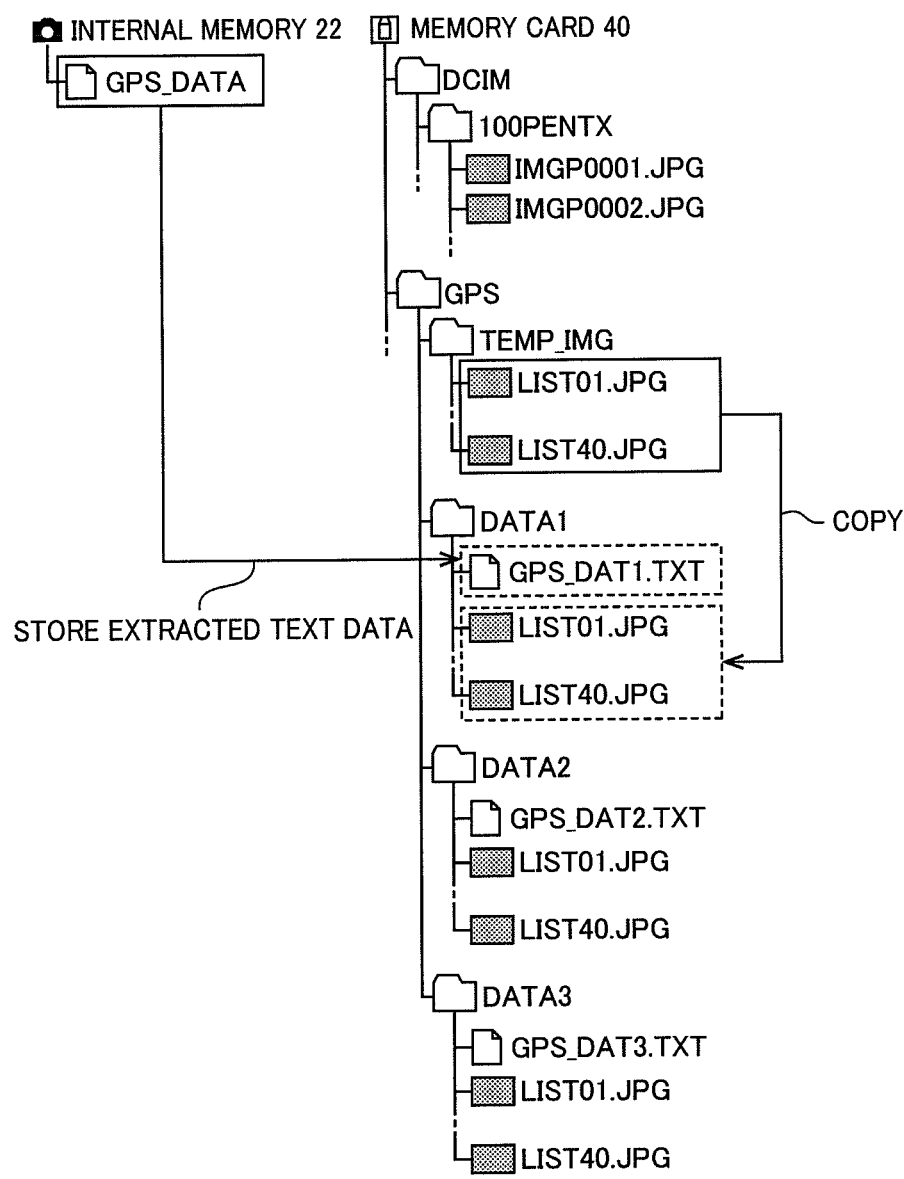
FIG. 7 is an explanatory illustration for explaining the destination information copy process shown in FIG. 6.

All the destination information (hereafter, the thumbnail image files and the destination list L stored in the TEMP_IMG folder are referred to as a "destination information set") can be entirely copied into an area which the user is able to access in the memory card 40. FIG. 6 is a flowchart illustrating a destination information copy process where a set of destination information is copied into the area which the user is able to access in the memory card 40. FIG. 7 is an explanatory illustration for explaining the destination information copy process shown in FIG. 6. FIG. 7 illustrates tree structures of folders in the memory card 40 and the destination list file GPS_DATA stored in the internal memory 22.

As shown in FIG. 7, directly under the GPS folder, a plurality of DATA folders (DATA1 folder, DATA2 folder, . . . ) are arranged in addition to the TEMP_IMG folder. When one of the DATA folders (the DATA1 folder in the example of FIG. 7) is selected as a copying target of the destination information set (S11: YES), text data of the destination list file GPS_DATA stored in the internal memory 22 is extracted, and a text file (filename: GPS_DAT1.TXT in the example of FIG. 7) is generated (S12). In the text data, predetermined control code information defining the type of text information is contained in addition to the text information such as a registration name. The generated text file GPS_DAT1.TXT is stored in the DATA1 folder (S13). Next, in step S14, all the thumbnail image files stored in the TEMP_IMG folder are entirely copied into the DATA1 folder, and the process of this flowchart terminates. It should be noted that when previously copied files are stored in the DATA folder selected as the copying target, the previously stored files are deleted before execution of the step S13.

In the example shown in FIG. 7, a plurality of data sets (i.e., DATA1, DATA2 and DATA3) are provided. Therefore, a user is able to manage data sets according to destinations or purposes. For example, the user may register photographing positions in Hokkaido Prefecture in the data set DATA1, and register photographing positions in Kyoto in the data set DATA2. In this case, the user may selectively use one of the data sets in accordance with the area to which the user goes. Alternatively, the user may classify the data sets in more detail for the same area. For example, the user may register photographing positions for landscapes in the data set DATA1, and register photographing positions for temples and shrines in the data set DATA2.

<3. Deletion of Destination Information>

Figure 8A:
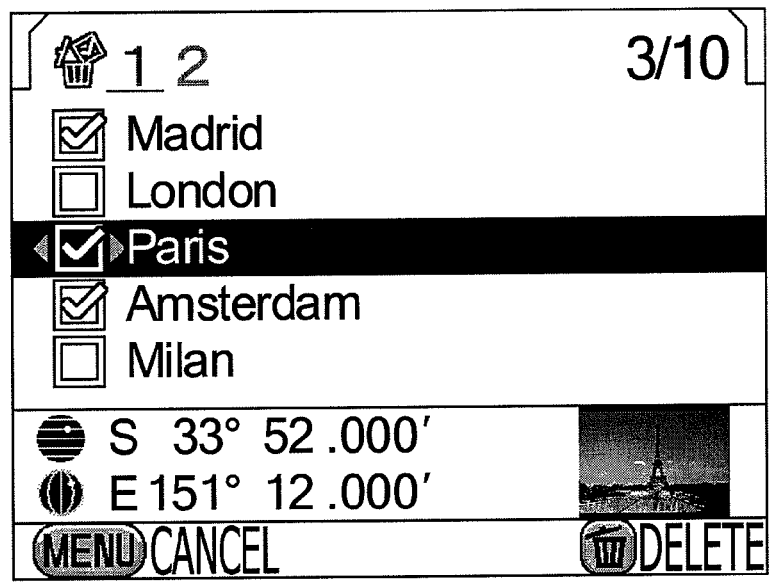
FIGS. 8A and 8B illustrate display screens after moving to a destination information deletion mode.
Figure 8B:
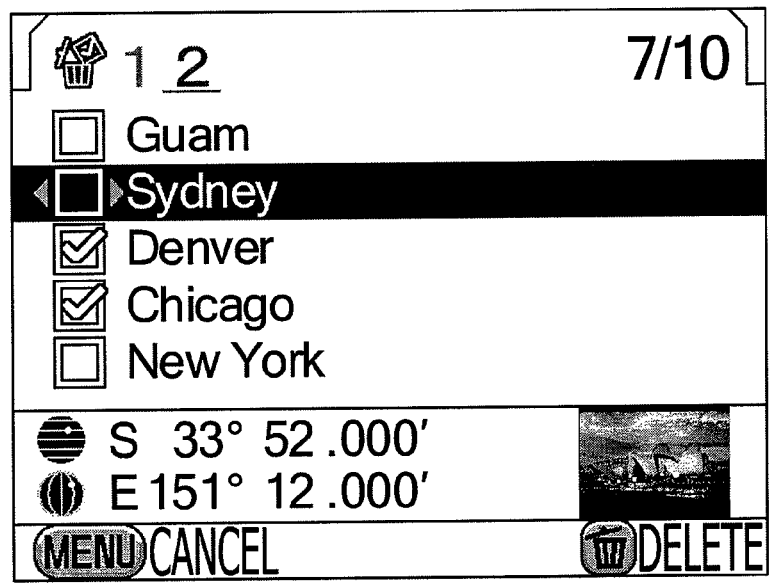
Figure 9:
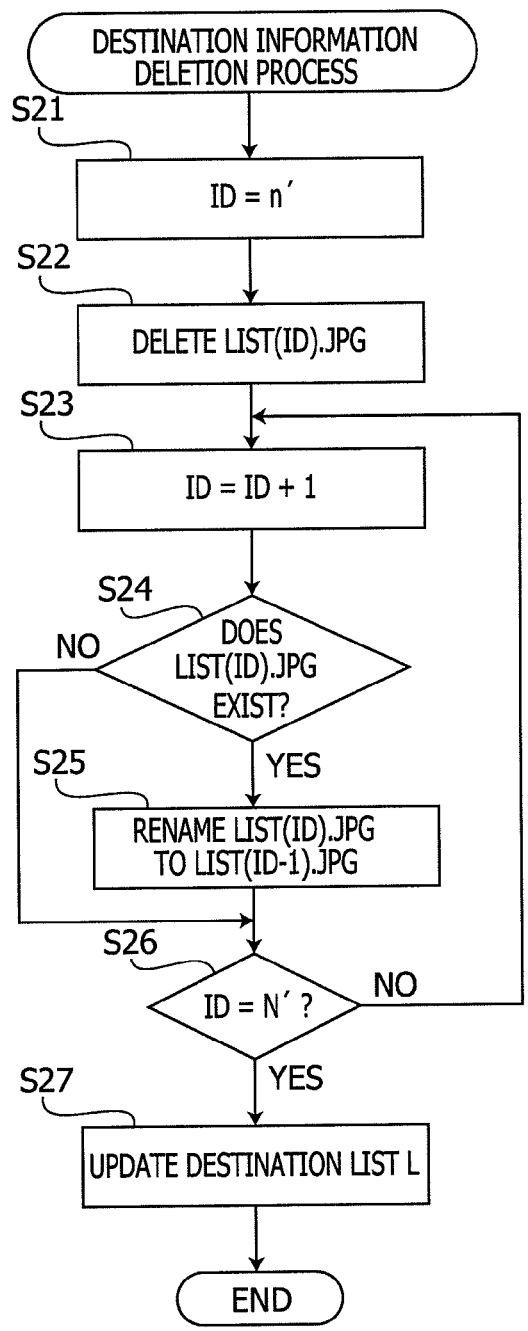
FIG. 9 is a flowchart illustrating a destination information deletion process executed to delete destinations from a destination list.

The mode of the imaging apparatus 1 moves to the destination information deletion mode in response to a predetermined user operation. FIGS. 8A and 8B illustrate examples of the display screens after moving to the destination information deletion mode. FIG. 9 is a flowchart illustrating the destination information deletion process executed to delete the registered destination information in the destination information deletion mode. Similarly to FIGS. 5A to 5B, FIGS. 10A to 10D are explanatory illustrations for explaining the destination information deletion mode. Specifically, FIG. 10A illustrates tree structures of folders in the memory card 40 before execution of deletion of the destination information, and FIG. 10B illustrates the destination list L before execution of deletion of the destination information. FIG. 10C illustrates tree structures of folders in the memory card 40 after execution of deletion of the destination information, and FIG. 10D illustrates the destination list L after execution of deletion of the destination information.

After moving to the destination information deletion mode, a list of registration names of destinations stored in the destination list L is displayed on the LCD monitor 20. As shown in FIGS. 8A and 8B, in this embodiment, five registration names of ten total registered destinations are displayed in one screen in consideration of the screen size of the LCD monitor 20. A check box for designating a destination to be deleted is assigned to each registration name. In this example, "Paris", "Amsterdam", "Denver" and "Chicago" are designated as deletion targets. In a lower column of the screen, the thumbnail image and the latitude and longitude information corresponding to the registration name being focused (selected) are displayed in order to enable the user to visually recognize the destination to be deleted.

When a deletion button in the lower column of the screen is selected after checking the check box, the destination information deletion process shown in FIG. 9 is executed for each of the destination information designated as the deletion target. In the destination information deletion process, N' is defined as the total number of the registered destinations before executing deletion of the destination information. n' is defined as ID (ID after remaining in the case where it is renamed in step S25 described later) of the destination designated as a deletion target.

As shown in FIG. 9, in step S21, the identification number ID is set for n'. In step S22, the file LIST(ID).JPG stored in the TEMP_IMG folder is deleted. In step S23, the identification number ID is incremented by 1. In step S24, existence of the LIST(ID).JPG in the TEMP_IMG folder is judged.

When it is judged that the file LIST(ID).JPG exists in step S24 (S24: YES), the file LIST(ID).JPG is renamed into LIST (ID-1).JPG (S25), and the process proceeds to S26. When the file LIST(ID).JPG does not exist (S24: NO), the process proceeds to S26 without executing step S25.

In step S26, it is judged whether the identification number ID is N'. When the identification number is N' (S26: YES), the destination list L is updated (S27), and the flowchart of this process terminates. In the updating process of the destination list L in step S27, the information of the destination designated as a deletion target is deleted, and the ID is renumbered in response to deletion. When the identification number ID is not N' (S26: NO), the process returns to step S23, and the renaming process is executed repeatedly.

In the examples of FIGS. 8A to 10D, the pieces of destination information corresponding to ID=3, 4, 8 and 10 are deleted. Therefore, as shown in FIGS. 10C and 10D, the thumbnail image files and the destination list L of the TEMP_IMG file are updated.

<4. Reading of Destination Information from Memory Card>

Figure 11:
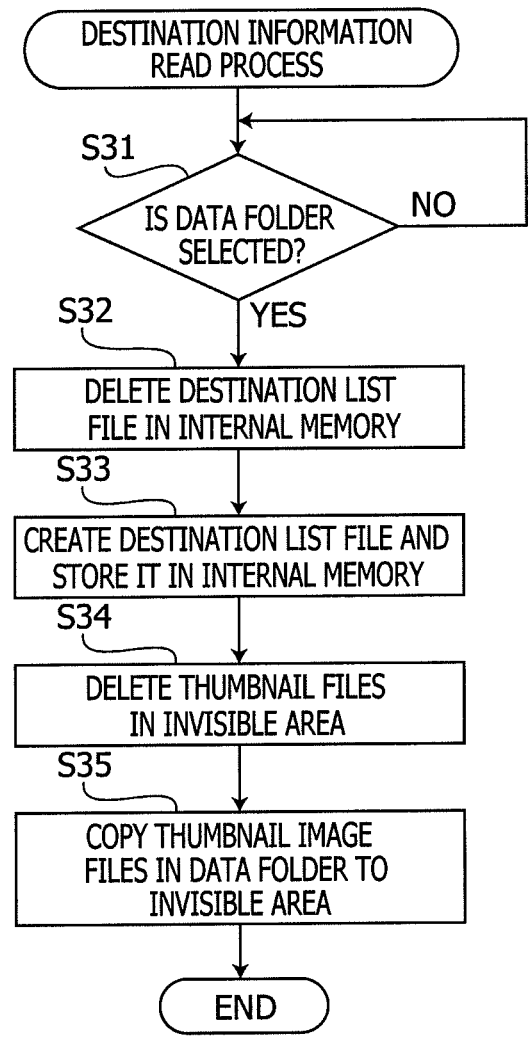
FIG. 11 is a flowchart illustrating a destination information read process executed when a file is read from a DATA folder directly under a GPS folder.
Figure 12:
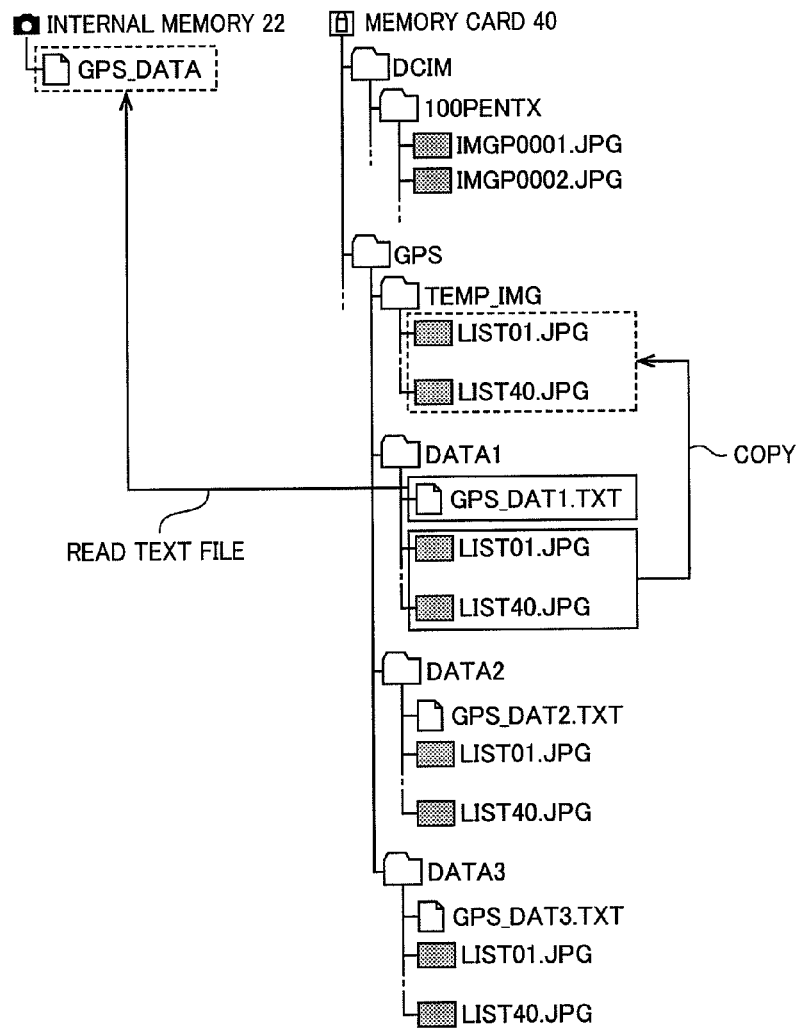
FIG. 12 is an explanatory illustration for explaining the destination information read process of FIG. 11.

FIG. 11 is a flowchart illustrating a destination information read process to be executed when a file is read from the DATA folder directly under the GPS folder. Similarly to FIG. 7, FIG. 12 is an explanatory illustration for explaining the destination information read process. As shown in FIG. 11, when one of the DATA folders (the DATA folder 1 in the example of FIG. 12) is selected as a read target (S31: YES), the destination list file GPS_DATA stored in the internal memory 22 is deleted (S32). Next, in step S33, the text file GPS_DAT1.TXT in the DATA1 folder is read and interpreted, the destination list file GPS_DATA is generated based on the interpretation result, and the destination list file GPS_DATA is stored in the internal memory 22. In step S34, all the thumbnail image files stored in the TEMP_IMG folder are deleted. In step S35, all the thumbnail image files stored in the DATA1 folder are copied into the TEMP_IMG folder, and the flowchart of this process terminates.

<5. Selection of Destination Information>

Figure 13:
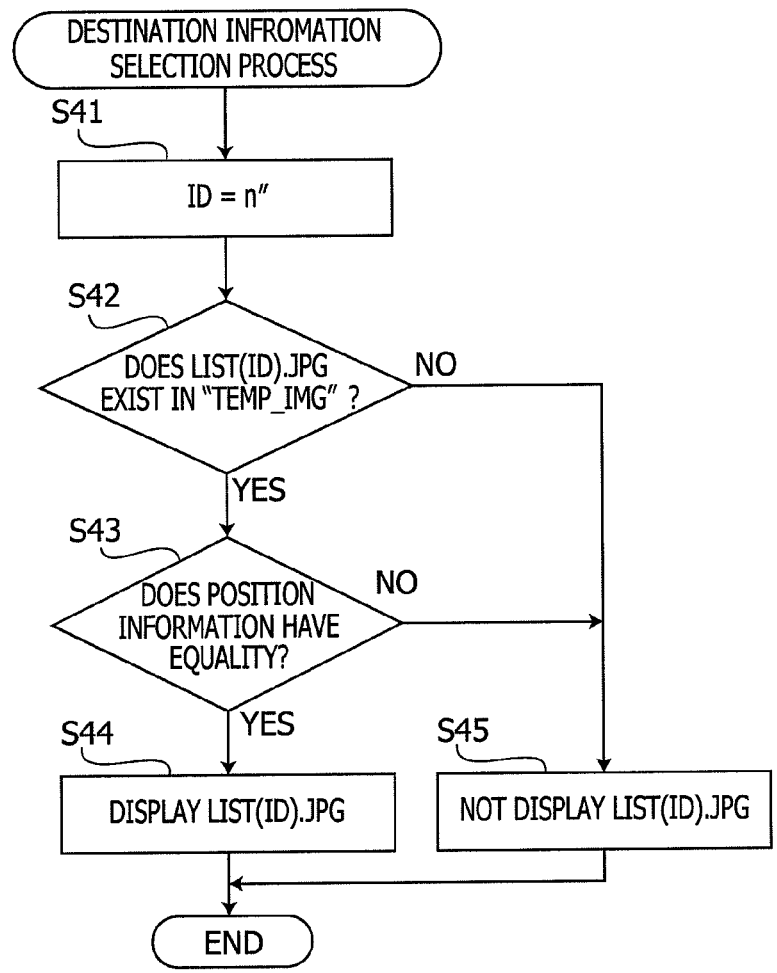
FIG. 13 is a flowchart illustrating a destination information selection process executed when a destination is set from the destination list.

The mode of the imaging apparatus 1 moves to a destination information selection mode in accordance with a predetermined user operation. FIG. 13 is a flowchart illustrating a destination information selection process executed when a destination is set from the destination list L in the destination information selection mode.

After moving to the destination information selection process, a list of the registration names of the destinations registered in the destination list L is displayed on the LCD monitor 20 in a condition where the maximum number of destinations to be displayed is five, as in the case of FIG. 8. At this time, the destination information selection process is executed for the registration name on which the focus is placed. In the destination information selection process, n" is defined as an ID of the registration name on which the focus is placed.

As shown in FIG. 13, in step S41, the identification number ID is set for n". In step S42, presence/absence of the file LIST(ID).JPG in the TEMP_IMG folder is judged. When the file LIST(ID).JPG exists (S42: YES), the position information (stored in the destination list L) corresponding to the registration name on which the focus is placed is compared with the geotag (position information) of the file LIST (ID).JPG to judge the equality (S43). It should be noted that the equality is not necessarily judged strictly. A small quantity of permissible range may be established so that two positions to be compared are judged to have equality even when the two positions deviate from each other by a certain distance. When the two positions to be compared have the equality, it is estimated that the user who is an owner of the imaging apparatus 1 has made a shooting previously at the place corresponding to the registration name. Therefore, when it is judged that the two positions have the equality (S43: YES), the file LIST(ID).JPG is displayed on the LCD monitor 29 (S44), and the flowchart of this process terminates. The user is able to visually recognize the place at which the user has made shooting in the past, through the LCD monitor 20.

Figure 14:
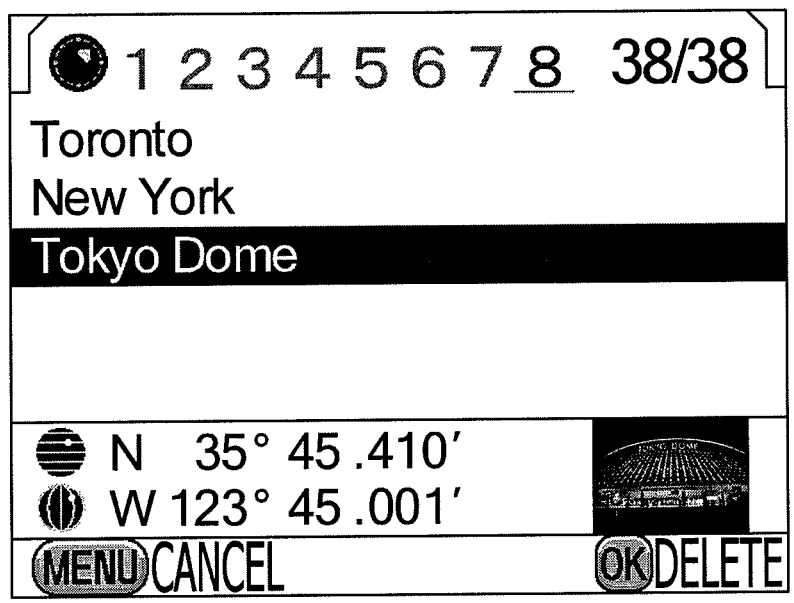
FIG. 14 illustrates an example of a screen displayed on a LCD monitor during execution of step S44 shown in FIG. 13.

FIG. 14 illustrates an example of the screen displayed on the LCD monitor 20 during execution of step S44 shown in FIG. 13. In the example of FIG. 14, the focus is placed on the registration name "Tokyo Dome" which is ID38 of the destination list L. In a lower column of the screen, the latitude and the longitude of the registration name and the thumbnail image of "Tokyo Dome" are displayed. When the Enter button is selected in this screen, the registration name "Tokyo Dome" is set as a destination. After setting the destination, a relative distance between the set position and the present position calculated by the GPS module 26 is displayed on the screen as simple navigation information.

When the file LIST(ID).JPG does not exist in the TEMP_IMG folder (S42: NO), the file LIST(ID).JPG cannot be displayed on the LCD monitor 20 (S45), and the flowchart of this process terminates. As a situation for which a judgment result "NO" is made in step S42, a case where the memory card inserted into the card slot 18 is an unrelated card in which data is not written by the imaging apparatus 1 or by a device of the same type.

When it is judged that the two positions do not have the equality in step S43, it is estimated that the user who is an owner of the imaging apparatus 1 has never made a shooting at the place corresponding to the registration name. In this case (S43: NO), regarding the image of this place, the file LIST(ID).JPG is not displayed on the LCD monitor 20 (S45), and the flowchart of this process terminates. Since the file LIST(ID).JPG is the photographic image not relating to the destination registered in the destination list L, the file LIST (ID).JPG may be deleted from the TEMP_IMG folder. It should be noted that as a situation where the judgment result "NO" is made in step S43, a case where the memory card inserted into the card slot 18 is an unrelated in which data is not written by the imaging apparatus 1 or by a device of the same type, as in the case of step S42.

Figure 15:
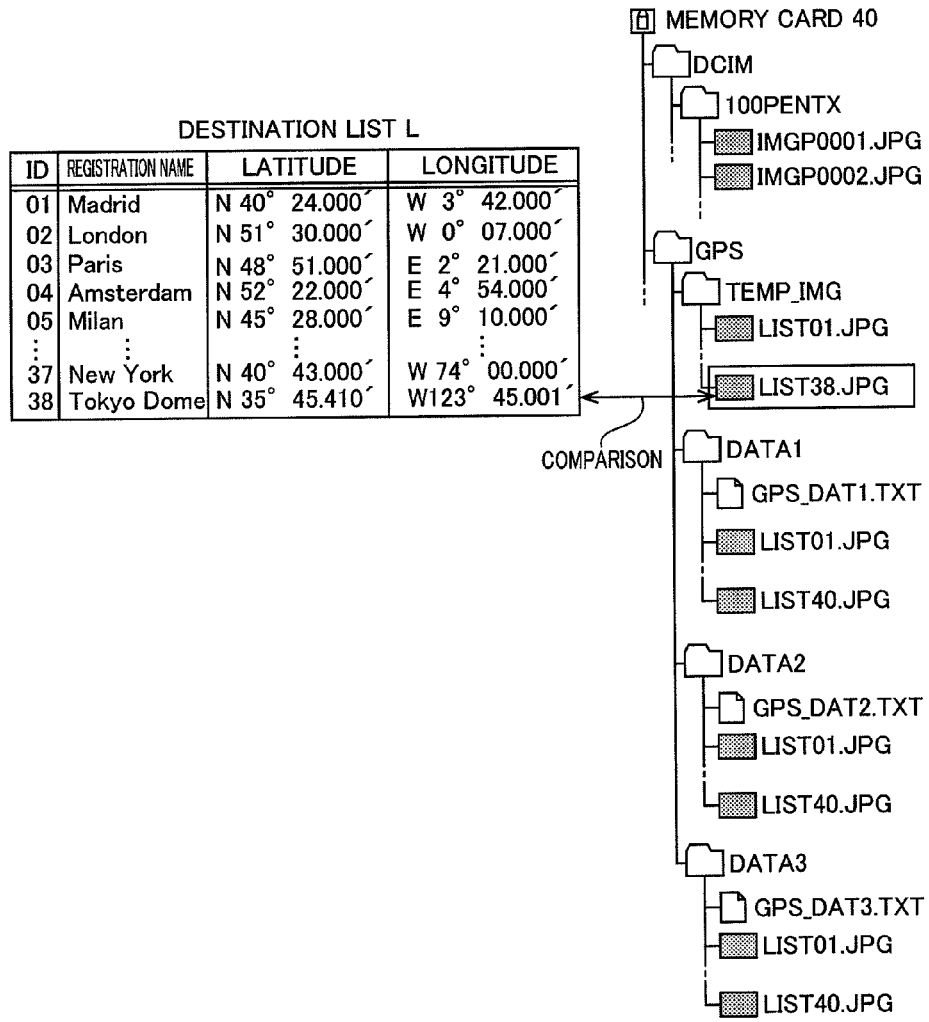
FIG. 15 is an explanatory illustration for explaining the destination information selection process of FIG. 13.

FIG. 15 is an explanatory illustration for explaining the destination information selection process of FIG. 13. FIG. 15 illustrates tree structures of folders in the memory card 40 and the destination list L. In the example shown in FIG. 15, the registration name "Tokyo Dome" of ID38 is selected. When the latitude and longitude of ID38 in the destination list L and the geotag of the file LIST(38).JPG of the TEMP_IMG folder have the equality, the screen shown in FIG. 14 is displayed on the LCD monitor 20. When the two positions do not have the equality, the latitude and the longitude and the thumbnail of the registration name "Tokyo Dome" are not displayed on the LCD monitor 20. Depending on the specifications of the imaging apparatus 1, the file LIST(38).JPG is regarded as an unnecessary file, and is deleted from the TEMP_IMG folder.

Immediately after moving to the destination information selection mode, prior to execution of the destination information selection process, the total number of destinations of the destination list L may be compared with the number of files in the TEMP_IMG folder. When it is judged that the number of files in the TEMP_IMG folder is larger than the total number of destinations as a result of the comparison, it is estimated that a part of files in the TEMP_IMG folder are unnecessary files. For example, when the total number of destinations is 38 and the number of files in the TEMP_IMG folder is 40, the file LIST(39).JPG and the file LIST(40).JPG do not have the corresponding destination information in the destination list L. Since there is a high possibility that these photographic images correspond to images taken at the place to which the user who is an owner of the imaging apparatus 1 has never gone, these files may be deleted.

The foregoing is the embodiment of the invention. It should be understood that the present invention is not limited to the above described embodiment, but various types of variations can be made within the scope of the technical concept of the invention.

This application claims priority of Japanese Patent Application No. P2011-072133, filed on Mar. 29, 2011. The entire subject matter of the application is incorporated herein by reference.

What is claimed is:
1. A photographing information management method, comprising:
    generating a thumbnail image from an image file, wherein the image file includes a photographic image, photographing position information is added to the image file as meta information of the photographic image, and the image file is stored in an external storage medium;
    extracting the photographing position information, which is the meta information of the photographic image, from the image file;
    generating a thumbnail image file by adding the extracted photographing position information to the thumbnail image as the meta information of the thumbnail image;
    generating a text file including the extracted photographing position information of the thumbnail image;
    storing the generated thumbnail image file in the external storage medium, the generated thumbnail image being stored in association with the generated text file in a directory different from a directory were the image file to which the photographing position information is added is stored;
    storing the photographing position information extracted from the image file in the internal memory;
    judging whether there is equality between photographing position information added to an image file stored in the external storage medium which is detachably attached to an imaging apparatus and the photographing position information stored in the internal memory of the imaging apparatus; and
    when it is judged that the two pieces of photographing position information have the equality in the judging, displaying the thumbnail image and the photographing position information of the thumbnail image file on a display screen of the imaging apparatus,
    wherein the generated thumbnail image file is configured to remain in the external storage medium when the image file is deleted from the external storage medium.

2. The photographing information management method according to claim 1, further comprising:
  designating the image file in the external storage medium; and
  judging whether the photographing position information is added to the designated image file;
  wherein in the generating a thumbnail image, the thumbnail image is generated only for the image file for which it is judged that the photographing position information is added.

3. The photographing information management method according to claim 2, further comprising:
  designating a deletion target from a plurality of pieces of photographing position information stored in the internal memory; and
  deleting the photographing position information of the designated deletion target and the thumbnail image file corresponding to the deletion target.

4. The photographing information management method according to claim 1, further comprising:
  obtaining the photographing position information of the photographic image using Global Positioning System; and
  generating the image file by adding the obtained photographing position information to the image file as the meta information of the photographic image.

5. The photographing information management method according to claim 1, wherein the thumbnail image is stored separately from the meta information of the photographic image, and
  the photographing position information, as the meta information of the thumbnail image, is stored separately from the photographing position information, as the meta information of the photographic image.

6. A photographing information management apparatus, comprising:
  a connector to which an external storage medium is detachably attached;
  an internal memory storing photographing position information;
  a thumbnail image generator configured to generate a thumbnail image from an image file, wherein the image file includes a photographic image, photographing position information is added to the image file as meta information of the photographic image, and the image file is stored in the external storage medium;
  a photographing position extractor configured to extract the photographing position information, which is the meta information of the photographic image, from the image file;
  a thumbnail image file generator configured to generate a thumbnail image file by adding the photographing position information extracted by the photographing position extractor, to the thumbnail image as the meta information of the thumbnail image;
  a text file generator configured to generate a text file including the extracted photographing position information of the thumbnail image;
  a thumbnail image file storing processor configured to store the generated thumbnail image file in the external storage medium, the generated thumbnail image being stored in association with the generated text file in a directory different from a directory were the image file to which the photographing position information is added is stored;
  a photographing position information storing processor configured to store the photographing position information extracted from the image file by the photographing position extractor, in the internal memory;
  an equality judger configured to judge whether there is equality between photographing position information added to an image file stored in the external storage medium and the photographing position information stored in the internal memory; and
  a display configured to display the thumbnail image file and the photographing position information of the thumbnail image file on a display screen when it is judged by the equality judger that the two pieces of photographing position information have the equality,
  wherein the generated thumbnail image file is configured to remain in the external storage medium when the image file is deleted from the external storage medium.

7. The photographing information management apparatus according to claim 6, further comprising:
  an image file designator configured to designate the image file in the external storage medium; and
  an information addition judger configured to judge whether the photographing position information is added to the designated image file,
  wherein the thumbnail image generator is configured to generate the thumbnail image only from the image file for which the information addition judger judges that the photographing position information is added.

8. The photographing information management apparatus according to claim 7,
  wherein the thumbnail image file storing processor is configured to store the thumbnail image file in an invisible area of the external storage medium, the invisible area being an area which a user is not able to recognize.

9. The photographing information management apparatus according to claim 8, further comprising:
  a deletion target designator configured to designate a deletion target from a plurality of pieces of photographing position information stored in the internal memory; and
  a deletion processor configured to delete the thumbnail image file in the invisible area corresponding to the designated deletion target, in addition to deleting the photographing position information of the designated deletion target.

10. The photographing information management apparatus according to claim 8, further comprising:
  a data storing processor configured to store thumbnail image files in the invisible area and a plurality of pieces of photographing position information in the internal memory corresponding to the thumbnail image files, in an accessible folder in the external storage medium.

11. The photographing information management apparatus according to claim 10, further comprising:
  a various information deletion processor configured to delete the thumbnail image files in the invisible area and the plurality of pieces of photographing position information in the internal memory; and
  a various information storing processor configured to store the thumbnail image files stored in the folder into the invisible area and to store the plurality of pieces of photographing position information into the internal memory.

12. The photographing information management apparatus according to claim 6, further comprising:
  a photographing position information obtainer configured to obtain the photographing position information of the photographic image using Global Positioning System; and an image file generator configured to generate the image file by adding the obtained photographing position information to the image file as the meta information of the photographic image.

13. The photographic information management apparatus according claim 6, wherein the thumbnail image is stored separately from the meta information of the photographic image, and
the photographing position information, as the meta information of the thumbnail image, is stored separately from the photographing position information, as the meta information of the photographic image.

* * * * *